United States Patent Office 2,961,422
Patented Nov. 22, 1960

2,961,422

RESINOUS COMPOSITIONS OF VINYL CHLORIDE COPOLYMERS WITH TRI-ESTERS OF PIMELIC ACID AS PLASTICIZERS

William E. Weesner, Dayton, Ohio, assignor to Monsanto Chemical Company, St. Louis, Mo., a corporation of Delaware No Drawing. Filed June 24, 1957, Ser. No. 667,702

9 Claims. (Cl. 260—31.8)

This invention relates to new, resinous compositions of matter having utility under widely varied conditions. More particularly the invention relates to the use of tri-esters of 4-acetyl-4-(2-carboxyethyl) pimelic acid as new compositions of matter and as plasticizers for vinyl halide resins.

The primary purpose of this invention is to provide improved plasticizers for vinyl halide resins such as vinyl chloride. A further purpose of this invention is to provide new, resinous compositions which have desirable flexibility over wide temperature ranges. A still further purpose of this invention is to provide resinous compositions which retain the plasticizer at elevated temperatures.

It has been found that tri-esters of 4-acetyl-4-(2-carboxyethyl) pimelic acid are efficient plasticizers for vinyl halide polymers, such as vinyl chloride. Examples of such esters are compounds having the following structural formula:

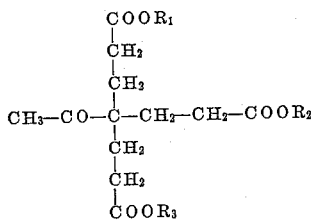

where $R_1$, $R_2$ and $R_3$ are each monovalent aliphatic radicals selected from the group consisting of hydrocarbon radicals having from 4 to 10 carbon atoms.

Preferred compounds are the octyl esters, such as di-(2-ethylhexyl)-4-acetyl-4-(2-carboethylhexyloxyethyl) pimelate having the structural formula:

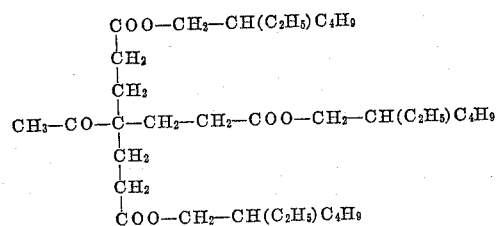

The substituted pimelic acids employed in the present invention may be prepared by the addition of acrylonitrile to acetone, whereby a trinitrile is produced which may then be hydrolyzed to obtain the acid.

The compounds which may thus be employed as plasticizers are those which may be prepared by reacting 4-acetyl-4-(2-carboxyethyl) pimelic acid with alcohols having from 4 to 10 carbon atoms of which the following are typical examples: n-butanol, isobutanol, n-amyl alcohol, iso-amyl alcohol, n-hexyl alcohol, 2-ethylhexanol, the cyclohexanols, tetrahydrofurfuryl alcohol, the various nonyl alcohols, the normal and branched-chain decyl alcohols, 2-ethoxyethyl alcohol, 2-butoxyethyl alcohol and other aliphatic monohydric alcohols having from 4 to 10 carbon atoms and the corresponding alcohols which have one or more —$CH_2$ groups replaced by oxygen atoms. Mixed esters derived from two different alcohols may also be employed.

The preparation of these plasticizers by esterification of the substituted pimelic acid may be carried out with the use of an esterification catalyst such as sulfuric acid or p-toluene sulfonic acid with or without the use of a solvent such as benzene. The water evolved during the esterification may be removed by a suitable continuous method, for example, with a Dean and Stark trap.

The new compounds are valuable plasticizers for polyvinyl chloride and copolymers of more than 70% of vinyl chloride and up to 30% of other monomers copolymerized therewith such as another polymerizable monoethylenically unsaturated monomer, for example, vinyl esters of monocarboxylic acids, acrylonitrile, vinylidene chloride and vinylidene fluoride.

The plasticizers are blended with the vinyl resin in the conventional manner, for example, by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5% to 60% of plasticizer will, in most cases, produce a satisfactory composition for general utility. Such quantity of plasticizer will generally remain as a permanent part of the vinyl resin and the modified vinyl resin so prepared will not deteriorate or become embrittled by reason of the loss of plasticizer during use.

The ability of chemical compounds to accomplish plasticization is estimated by several tests: (1) compatibility, (2) volatility, (3) Clash-Berg flex temperature, and (4) water extraction. The compatibility is determined by visual inspection of the plasticized polymer film, no exudation of the plasticizer or cloudiness of the film is permitted since clarity is a requisite in many applications for vinyl chloride polymers. The volatility is determined by heating a sample of the plasticized polymer film at 105° C. for 24 hours, whereby the loss in weight of the sample gives a measure of the plasticizer evaporated and accordingly of the volatility. The Clash-Berg flex temperature is determined by cooling the polymer sample to about —50° C. and observing the change in the modulus of rigidity as the sample warms to room temperature, the flex temperature being that at which the modulus of rigidity is 135,000 pounds per square inch. Water extraction and the amount of water absorption are determined by immersing a sample of the plasticized composition in distilled water for 24 hours, after which the weight of water absorbed and the amount of leaching of the plasticizer are determined. Of these tests, compatibility is of primary importance, while the others are only critical for certain applications. If the polymer is to be subjected to outside weather conditions, flex temperatures of —25 to —35° C. are desirable. If the polymer is to be subjected to elevated temperatures a volatility of less than 5% to 10% is advantageous; lower volatility losses are, of course, desirable. The volatility and flex temperatures of polymer-plasticizer blends are difficult to predict and often have no apparent relationship to the physical constants of the plasticizer.

The new plasticizers are of general utility in softening vinyl chloride polymers and are effective over a wide range of temperatures. They may be used as the only plasticizing component in a compounded vinyl chloride polymer, or they may be used in conjunction with other plasticizers.

The following examples illustrate specific embodiments of the present invention:

Example 1

The compound, 4-acetyl-4-(2-carboxyethyl) pimelic acid was prepared beginning with the cyanoethylation of acetone with acrylonitrile using tertiary butyl alcohol as the solvent and potassium hydroxide as the catalyst. The cyanoethylation gave the intermediate 4-acetyl-4-(2-cyanoethyl) pimelonitrile. The nitrile (1.14 mols) was hydrolyzed by heating in water made strongly alkaline by the use of 5.0 moles of potassium hydroxide. The resulting 4-acetyl-4-(2-carboxyethyl) pimelic acid so obtained had a melting point of 147–148° C. A decyl ester of the acid was prepared by esterification with a refined mixture of isomeric decyl alcohols obtained by the oxo reaction. Fifty-four and eight tenths grams of the acid and 110.6 g. of the isodecyl alcohol were mixed in a reaction vessel, together with 2 g. of p-toluene sulfonic acid monohydrate. The reaction mixture was heated and the esterification was found to begin at 84° at 100 mm. vacuum. The water resulting from the esterification was collected in a Dean-Stark trap which removed the water as it was formed. After water evolution had ceased, the reaction mixture was neutralized with 0.5 g. of sodium carbonate dissolved in water. The product was then washed with water and was steam distilled at 100–110° C./120 mm. The product was water washed and water and low boilers removed by heating to 195° C./0.5 mm. The didecyl-4-acetyl-4-(2-carbodecyloxyethyl) pimelate had the analysis: C, 72.53, H, 11.22, while the calculated values for this ester, $C_{42}H_{8}O_7$, were: C, 72.61; H, 11.24. The refractive index was 1.4635 at 25° C.

The triethyl ester ($n_D^{25}$ 1.4595) and the tributyl ester ($n_D^{25}$ 1.4581) were prepared by the above reaction utilizing ethyl alcohol and n-butyl alcohol respectively.

Example 2

Using test procedures described above the efficacy of a number of pimelate esters was tested as plasticizers for polyvinyl chloride resins. A blend of 40 parts by weight of the ester and 60 parts of polyvinyl chloride was milled until a homogeneous mixture was obtained. The volatility, flex temperature and water absorption were measured by the standard methods described above. The following table sets forth the observed data:

|  | Clash-Berg Flex (° C.) | (Percent Loss) Volatility | Water Absorption | |
|---|---|---|---|---|
|  |  |  | Percent Soluble Matter Lost | Percent Absorption |
| Dibutyl 4-acetyl-4-(2-carbobutoxyethyl) pimelate | −26.9 | 2.1 | 0.14 | 1.14 |
| Diethyl-4-acetyl-4-(2-carboethyloxyethyl) pimelate | −19.4 | 5.5 | 3.50 | 1.62 |
| Didecyl 4-acetyl-4-(2-carbodecyloxyethyl) pimelate | −33.2 | 1.5 | 0.09 | 0.87 |

As can be seen from the table, the flex temperatures of the tributyl and tridecyl esters are remarkably low, indicating that the plasticized film would remain flexible even at very low temperatures. The slight volatility loss of these esters is indicative of retention of the plasticizer in the film at high temperature, while the water absorption properties also show excellent results. These data indicate the marked superiority of the esters having alkyl radicals of from 4 to 10 carbon atoms.

What I claim is:

1. A resinous composition of matter which is composed of a copolymer of at least 70% by weight vinyl chloride and up to 30% of another polymerizable monoethylenically unsaturated monomer compatible therewith, and a compound having the structural formula:

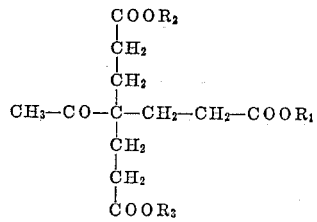

wherein $R_1$, $R_2$ and $R_3$ are monovalent aliphatic hydrocarbon radicals having from 4 to 10 carbon atoms.

2. A resinous composition of matter which is composed of a copolymer of at least 70% by weight vinyl chloride and up to 30% of another polymerizable monoethylenically unsaturated monomer compatible therewith, and a compound having the structural formula:

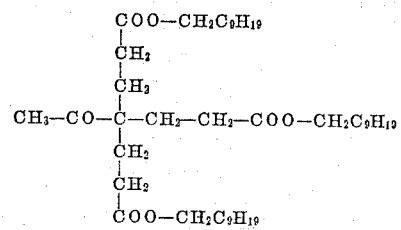

3. A resinous composition of matter which is composed of a copolymer of at least 70% by weight vinyl chloride and up to 30% of another polymerizable monoethylenically unsaturated monomer compatible therewith, and a compound having the structural formula:

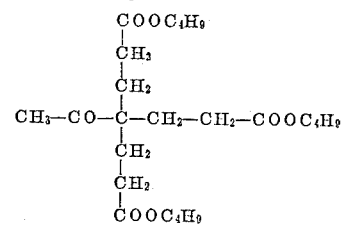

4. A resinous composition of matter which is composed of a copolymer of at least 70% by weight vinyl chloride and up to 30% of another polymerizable monoethylenically unsaturated monomer compatible therewith, and a compound having the structural formula:

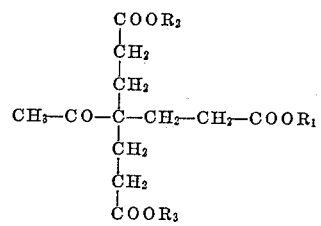

where $R_1$, $R_2$ and $R_3$ are each monovalent aliphatic hydrocarbon radicals having from 4 to 10 carbon atoms the proportion of the said compound being from 5 to 60% by weight relative to the weight of the said polymer.

5. A resinous composition of matter which is composed of a copolymer of at least 70% by weight vinyl chloride and up to 30% of another polymerizable monoethylenically unsaturated monomer compatible therewith, and a compound having the structural formula:

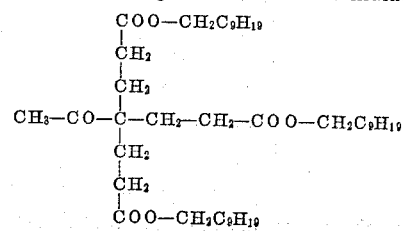

the proportion of the said compound being from 5 to 60% by weight relative to the weight of the said polymer.

6. A resinous composition of matter which is composed of a copolymer of at least 70% by weight vinyl chloride and up to 30% of another polymerizable monoethylenically unsaturated monomer compatible therewith, and a compound having the structural formula:

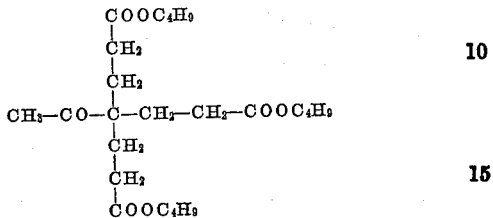

the proportion of the said compound being from 5 to 60% by weight relative to the weight of the said polymer.

7. A compound having the structural formula:

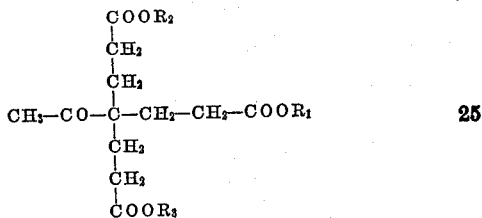

wherein $R_1$, $R_2$ and $R_3$ are monovalent aliphatic hydrocarbon radicals having from 4 to 10 carbon atoms.

8. The compound having the structural formula:

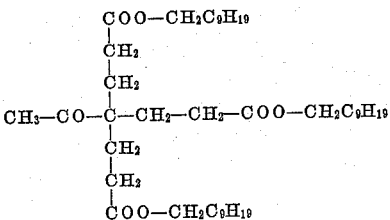

9. The compound having the structural formula:

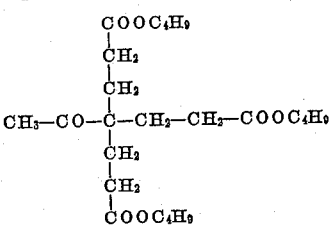

References Cited in the file of this patent

UNITED STATES PATENTS 2,374,327    Bruson _____ Apr. 24, 1945

FOREIGN PATENTS 593,475    Great Britain _____ Oct. 17, 1947